Aug. 28, 1928.
H. R. STRAIGHT
1,682,200
PROCESS FOR FORMING CERAMIC WARE
Filed June 14, 1926
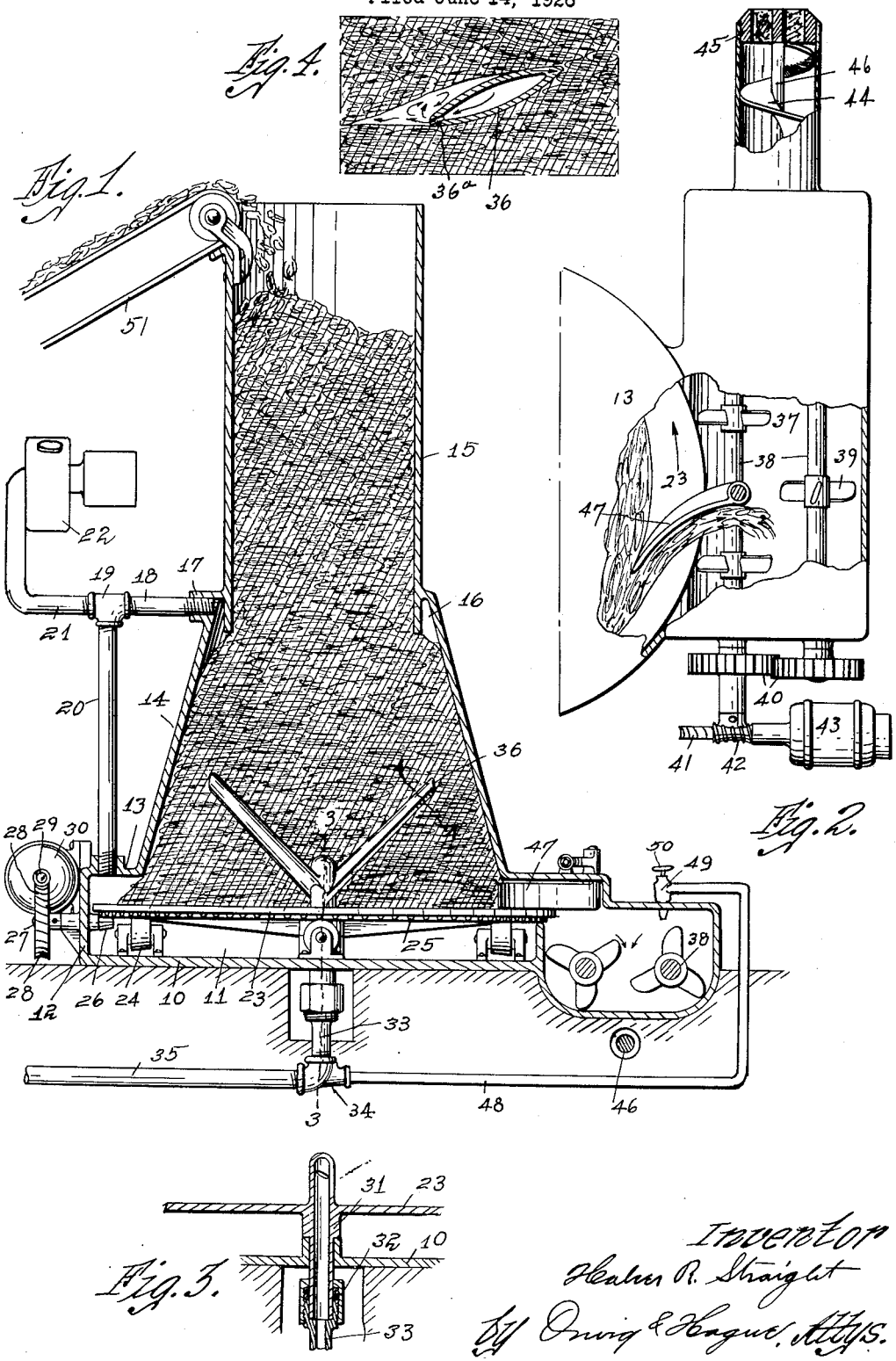

Patented Aug. 28, 1928.

1,682,200

UNITED STATES PATENT OFFICE.

HALVER R. STRAIGHT, OF ADEL, IOWA.

PROCESS FOR FORMING CERAMIC WARE.

Application filed June 14, 1926. Serial No. 116,035.

This invention relates to improvements in the method of treating and forming plastic material from which ceramic ware is formed.

I have found that the solidity and tenacity of ceramic ware may be greatly increased by expelling or extracting the air from the material while in a plastic condition, permitting the small particles of material to be perfectly united to form a homogeneous mass.

It is, therefore, the object of my invention to provide a process whereby granulated shale and the like may be reduced to a plastic condition, and expel from the material a large percent of the free air therein while the mixing of the material takes place.

My invention consists in the construction, arrangement and combination of the various steps of the process, whereby the objects contemplated are attained, as hereinafter more fully set forth, pointed out in my claims, and illustrated in the accompanying drawings, in which:

Figure 1 is a vertical sectional view through the apparatus for carrying out my improved process.

Figure 2 is a plan view of a portion of the hopper, the pug mill and a portion of the tile machine, a part of the same being cut away to show the interior construction.

Figure 3 is a detail sectional view taken on the line 3—3 of Figure 1.

Figure 4 is a detail sectional view taken on the line 4—4 of Figure 1.

The numeral 10 indicates a base forming the bottom of a container 11, said container having a cylindrical wall 12 which terminates in an annular horizontal top portion 13. The inner edge of the member 13 is provided with an upwardly projecting wall 14 in the form of a truncated cone. Projecting downwardly into the upper end of the wall 14 is a cylindrical wall 15, the lower end of which extends below the upper end of the member 14 a considerable distance to provide an air pocket 16. Communicating with the pocket 16 is a screw threaded opening 17 in the upper end of the wall 14 designed to receive a pipe 18 having a T 19. Said T 19 is provided with a downwardly extending pipe 20 which extends through the annular top 13. An exhaust pipe 21 is connected to the T 19, which in turn is connected to an exhaust fan 22.

Rotatively mounted in the chamber 11 is a circular platform 23 mounted on rollers 24. Said platform 23 is rotated through a circular rack 25 secured to its under surface, and a pinion 26 mounted on a suitable shaft 27, extending through the sides of the wall 12. Said shaft 27 is driven by a worm gear 28 and a worm 29 from the motor 30. The center of the platform 23 is provided with a downwardly extending hub 31 which is formed hollow and is rotatively mounted in a packing box 32 on the upper end of a pipe 33. Said pipe 33 is provided with a T 34 having a supply pipe 35 which may be connected with any supply of steam under pressure. The upper end of the hub 31 extends upwardly above the platform 25 and has upwardly and outwardly extending mixing members 36, each of which is formed hollow to form steam compartments in communication with the pipe 31. The members 36 are inclined relative to their rotary path of travel and so arranged that material within the member 14 may be forced downwardly onto the platform 23, in the manner hereinafter made clear.

Adjacent to one side of the wall 12 is a rectangular chamber 37 for receiving the pug mill which consists of a pair of rotary shafts 38 and agitator blades 39. The outer ends of the shafts 38 are connected by gears 40, and one of the shafts 38 is driven through a worm gear 41 and a worm 42 from the motor 43. Adjacent to one end of the pug mill is mounted an auger 44 of the tile machine which works adjacent to the die 45. The auger 44 is driven from the shaft 46.

Pivotally mounted in the upper side of the pug mill 37 is a blade 47, which projects inwardly above the platform 23, and is so arranged that when the platform is rotated in the direction of the arrows in Figure 2, a portion of the material on the platform will be gathered and delivered to the pug mill 37.

Connected with the T 34 is a pipe 48 connected with a nozzle 49, said nozzle being projected into the pug mill and provided with a control valve 50. A conveyor 51 is provided for delivering granulated shale to the upper end of the tube 15, said shale being delivered to said tube which will be delivered to the platform 23 until the members 14 and 15 have become filled, at which time steam is caused to enter the pipe 35 under pressure, a portion of which will move upwardly through the pipes 33 and 31 and into the members 36 and be discharged through the opening 36ª. The motor 30 is then operated and the platform 23 rotated, together with the members 36, said members 36 being set at an angle relative to the rotation to cause a downward movement of the material within the members 14. It will be seen that the steam will be caused to enter the cavities between the particles of shale and cause any free air to be driven therefrom, the air collecting in the chamber 16 from where it will be drawn by means of the fan 22 through the pipe 18. Some of the air will be driven outwardly through the bottom of the stack of shale and will be removed through the pipe 20. A portion of the shale will be delivered to the pug mill 37 by means of the blade 47. The condensed steam supplies moisture for reducing the shale to a plastic condition, which is partially done by the arms 36 and completed by the pug mill 37. The material is then delivered to the auger 44 and forced through the die 45, which may be of any desired shape. Steam may be admitted through the nozzle 49, if so desired, to increase the amount of moisture supplied to the pug mill, and also to further assist in extracting the air from the material being pugged.

It will be seen that due to the squeezing and agitation of the pug mill, a considerable amount of air will be released at this point, which will not be released in the member 14. This excess air, and possibly a small amount of steam or moisture, will be drawn from the pipe 20, as the compartment 11 and the pug mill are in communication.

It will be seen that by providing the upright pipe 15 the material within the said pipe forms a seal for the upper end of the compartment within the member 14, while the material being forced through the die forms a seal at the outlet end of the mill.

It will be seen that I have provided an improved process of reducing granulated shale and the like to a plastic condition, in which a large percent of the free air is removed to permit the particles of shale to be united by cohesion, while under pressure of the auger of the mill, thereby producing ware of more uniform texture and more compact and of greater strength than it would otherwise be if the air were mixed with the material.

I claim as my invention:

1. The process of reducing shale and the like to a plastic condition, which consists in first reducing the shale to a granulated condition, then piling the same in an upright stack having its bottom and side edges sealed, then stirring the shale in the central and bottom portion of the pile, and introducing steam to said central and bottom portion under pressure in quantities in excess of its condensation.

2. The process of reducing shale and the like to a plastic condition, which consists in first reducing the shale to a granulated condition, then piling the same in an upright stack having its bottom and side edges sealed, then stirring the shale in the central and bottom portion of the pile, introducing steam to said central and bottom portion under pressure in quantities in excess of its condensation, and then removing the heated and moist material from the bottom of the pile, pugging the same and again introducing steam under pressure to said material while the pugging action is taking place.

3. The process of reducing shale and the like to a plastic condition, which consists in first reducing the shale to a granulated condition, then piling the same in an upright stack having its bottom and side edges sealed, then stirring the shale in the central and bottom portion of the pile, then introducing steam to said central and bottom portion under pressure in quantities in excess of its condensation, and then continuously removing the heated and moist material from the bottom of the pile and continuously replacing it by adding new material to the top of the pile.

Des Moines, Iowa, May 20, 1926.

HALVER R. STRAIGHT.